Oct. 11, 1966     L. A. WILLIAMS     3,278,411
ELECTROLYZING ELECTRODE
Filed Sept. 10, 1962
Fig. 1.
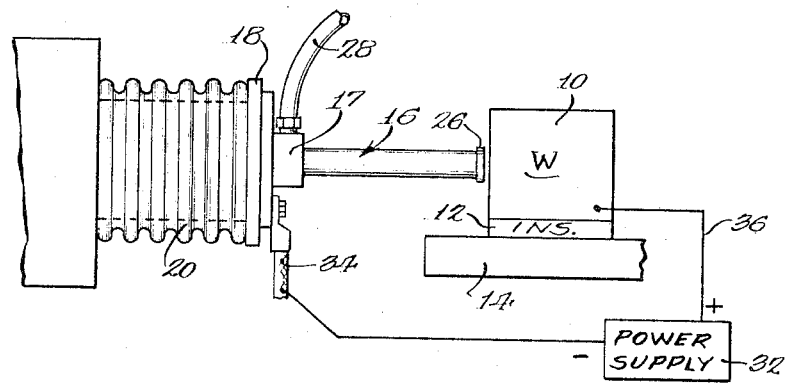
Fig. 2.
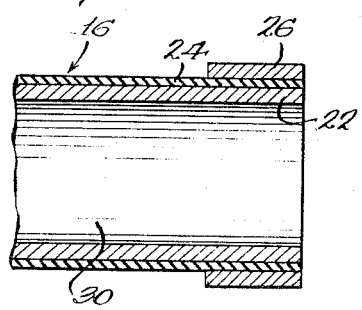
Fig. 3.
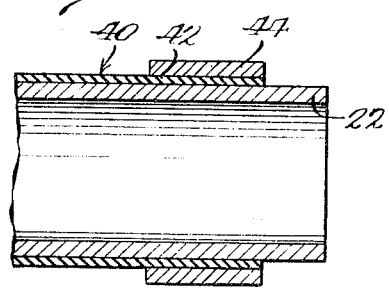
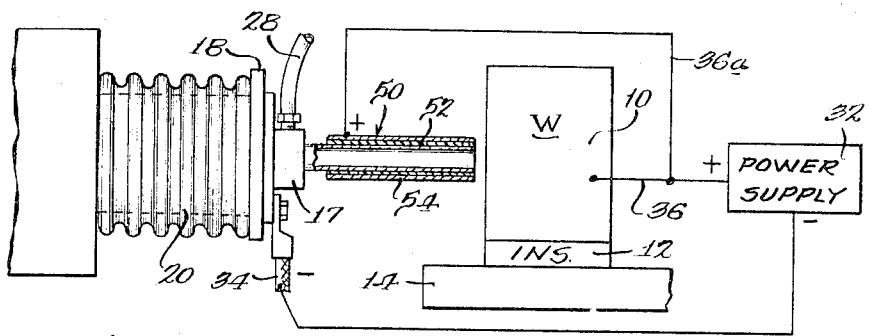
Fig. 4.
INVENTOR:
Lynn A. Williams
BY
Wupper, Gradolph & Love
Attys.

3,278,411
ELECTROLYZING ELECTRODE
Lynn A. Williams, Winnetka, Ill., assignor to Anocut Engineering Company, Chicago, Ill., a corporation of Illinois
Filed Sept. 10, 1962, Ser. No. 222,320
12 Claims. (Cl. 204—290)

This invention relates to electrodes and related equipment for the electrolytic removal of work material for the production of cavities, holes, and the like, and more particularly to an electrode which is especially adapted for the formation of small diameter holes or small sized holes of various transverse shapes.

One of the objects of the invention is to provide a novel electrolyzing electrode which is well adapted for sinking small, straight, uniform sized holes and cavities, and which can be manufactured at a reasonable cost.

Another object is to provide an improved electrode which gives a precise control over the side cutting action and thus prevents the inadvertent production of holes of uneven diameter or transverse shape.

It is a further object to provide an improved and novel electrode which is well adapted for the production of deep, small sized, untapered holes of excellent surface finish.

The invention, both as to its organization and method of operation, taken with further objects and advantages thereof, will best be understood by reference to the following description taken in conjunction with the accompanying drawings, in which:

FIG. 1 is a diagrammatic side view of an apparatus employing an electrode embodying the features of the present invention;

FIG. 2 is a fragmentary cross sectional view of the working end of the electrode shown in FIG. 1;

FIG. 3 is a fragmentary cross sectional view, similar to FIG. 2, of a modified electrode embodying the features of the present invention; and FIG. 4 is a diagrammatic side view of an apparatus employing a modified electrode embodying the features of the invention, the electrode being shown in cross section.

In the copending application of Lynn A. Williams, Serial No. 772,960, filed November 10, 1958, now patent No. 3,058,895, for "Electrolytic Shaping," there is described and illustrated in considerable detail apparatus for electrolytic hole sinking and related applications. In general, such arrangements provide for the support of a workpiece and an electrode in a configuration such that the electrode can be advanced toward and into the workpiece at a controlled rate as the material is electrolytically removed from the work. An electrolyte is pumped under pressure through the work gap between the free end and working face of the electrode and the workpiece by a passage through the electrode. The work and electrode are connected into a low potential, high amperage capacity, direct current circuit such that the electrode is cathodic relative to the work.

In that copending application, a tubular electrode is described having a free end which is flared outwardly, or is provided with a ring, to form a lip of larger transverse dimension than the tubular section. This lip provides the working surface, such that the hole formed has a transverse dimension slightly larger than the tube size, thus providing clearance for a layer of insulation on the exterior side wall of the tube above the lip.

Although an electrode of this character functions satisfactorily, it has serious disadvantages from the manufacturing standpoint, particularly in manufacturing a very small electrode, one for making .050″ diameter holes, for instance. Furthermore, lipped electrodes of such small size are extremely fragile.

Many of these problems are overcome by the electrode described and illustrated in considerable detail in the copending application of Lynn A. Williams, Serial No. 853,194, filed November 16, 1959, now patent No. 3,120,482, for "Electrolyzing Electrode." The electrode disclosed therein comprises a tubular section having a thin layer of insulation on the outside thereof extending almost, but not quite, the entire length of the electrode. Under ideal condtions, of course, this thin layer of insulation material would prevent uncontrolled side cutting action by the electrode. However, it has been found that there is a tendency for the electrode, no matter how precise the control or guide means, to move slightly laterally in the cavity being formed, whereby the layer of insulation contacts the work, which rubs or abrades the insulation from the electrode as it is advanced into the cavity being formed. Particularly is this true in long cavities having a small diameter. When the insulation material is removed, this exposes a greater electrode area whereby undersirable side cutting action and uneven diameter or shaped holes result. Also, it has been found that the end of the insulation layer at or adjacent the tip may be damaged or broken by a fine shower of sparks which may be unintendedly present from time to time during operation.

In the present invention, protection of the insulating layer is provided by the addition of a metallic shield made of metal of a kind which, even though it may become anodic relative to the working tip of the electrode, will not be attacked with the particular electrolyte solution being used. Tantalum and tungsten are of this kind and develop passive layers with ordinary solutions of sodium or potassium chloride, and also with many other types of solutions. The same is true with respect to niobium or columbium, although no tests have been conducted with this material to the present date. It is also reported that titanium exhibits the requisite passivity when operated in an electrolyte of sulphuric acid. What is required in general is that the metal shield be of such kind that even if it be anodic relative to the negative working tip of the electrode, it will not be eaten away when current passes through the electrolyte even though the electrolyte is of a kind which permits rapid attack on the work material. Fortunately, it is possible to obtain small diameter tubing of tantalum because of the rather extensive use of this material in many vacuum tubes. For this reason of convenience, tantalum may be a preferred material. It is also possible, however, to apply the material by sputtering, by evaporation, etc., and the reference to existing tubing should not be taken to negate other ways of obtaining the necessary shielding, particularly as applied to electrodes which are not round.

The sleeve becomes anodic by contact with the work or by current flow through the electrolyte, and it will not itself be attacked; it will not draw current away from the work, but because it is a durable tough metal it will prevent the layer of insulation from being removed from the conductive tube.

Referring to the drawings, and more particularly to FIGS. 1 and 2, a workpiece 10 is shown mounted upon insulation 12 secured to a satisfactory member 14 of an electrolytic removal apparatus. If desired, the member 14 may be a work table which will enable the work 10 to be orientated as desired.

An electrode 16, embodying the features of the present invention, is secured to an electrolyte manifold 17 mounted on a drive head 18, which is at the end of a screw drive advanced ram enclosed for its protection within a bellows 20. The ram mechanism is such that the drive head 18 may be advanced at any selected rate to move the electrode 16 into and out of the workpiece 10. This mechanism is more fully shown and described in the copending application of Lynn A. Williams, Serial No. 73,154, filed September 2, 1960, entitled "Electrolytic Cavity Sinking Apparatus and Method."

The electrode 16 comprises a length of conductive metal tubing having one end adapted to be secured to a holder, not shown, for mounting on the manifold 17. The conductive metal tubing 22 is made of brass, copper, stainless steel, or other suitable conductive material. The exterior side wall of the tube 22 is coated with a thin, but impervious layer of insulating material 24, in this instance throughout its entire working length. The insulating material 24 should be substantially unaffected by the electrolyte, have good adhesion to the metal tube 22, and have good film strength. For this purpose, it has been found that ceramic coatings and commercially available epoxy resins are satisfactory. Positioned at the free end of the electrode 16 and at the end of the insulation layer 24, is a sleeve or ring 26 of tantalum, tungsten, columbium, or titanium which, as will be more apparent hereinafter, protects the layer of insulation material 24 in order that it be not removed when the electrode 16 progresses into the workpiece 10.

The conductive metal tubing 22 may have a wall thickness as small as about .005", but it will be understood that wall thicknesses of about .015" or greater may be employed. The layer of insulation material 24, particularly when epoxy resin is employed, will have a thickness in the range of about .0005" to .007", it being preferable to maintain the layer of insulation 24 as thin as possible while still providing a complete coating around the conductive tube 22. The sleeve will have a thickness in the range of about .004" to .01". The smaller the thickness of the sleeve 26, the less side cutting required to make the hole large enough to clear the sleeve 26.

The electrode 16 may be constructed by coating the conductive tube 22 with an epoxy resin and curing the coating to form a very thin even layer of insulation material 24 about the conductive tube 22. If need be, the tip portion is turned in a jeweler's lathe to produce a smooth round surface barely smaller than the refractory metal sleeve to be slipped over it. An additional coat of epoxy is then placed on the exterior of the conductive tube 22 where the sleeve 26 is to be affixed to the electrode. The sleeve 26 is slipped over the tube 22 and held in place by the adhesive properties of the second coat of epoxy resin which is then cured. The use of epoxy as adhesives, is of course well known in the art.

Electrolyte is supplied to the electrode 16 under pressure from a hose 28 connected to the manifold 17, through the electrolyte holder (not shown) and thence to the electrode tip by way of a central passage 30 in the conductive tube 22 of the electrode 16. A negative side 34 of an electrolyzing power supply 32 is connected to the drive head 18 and thus to the conductive tube 22 of the electrode 16. The positive side 36 of this circuit is connected to the workpiece 10.

The general operation of the electrolytic hole sinking machine illustrated in FIG. 1 is discussed in considerable detail in the above mentioned copending applications Serial No. 772,960, filed November 10, 1958, for "Electrolytic Shaping," Serial No. 853,195, filed November 16, 1959, for "Electrolyzing Electrode," and Serial No. 73,154, filed September 2, 1960, for "Electorlytic Cavity Sinking Apparatus and Method," and need not be discussed in detail herein. Suffice it to say it will be understood that the electrode 16 is advanced toward and into the workpiece 10 at a controlled rate as material is electrolytically removed from the work 10. The electrolyte is applied under pressure to an interface between the tip of electrode 16 and the work 10 by way of the passage 30 through the electrode, or the flow may preferably be reversed as shown in the copending applications of Joseph L. Bender and Lynn A. Williams, Serial No. 37,766, filed June 21, 1960, and now abandoned, for "Electrolytic Cavity Sinking Apparatus and Method," and Lynn A. Williams, Serial No. 212,916, filed July 27, 1962, for "Electrolytic Cavity Sinking Apparatus and Method." The work 10 and electrode 16 are connected into the power supply 32 in the manner described above, such that the conductive tube 22 of the electrode 16 is cathodic relative to the work 10.

As discussed hereinbefore, the principal disadvantage of the electrode of application Serial No. 853,195, which merely employed a layer of insulation material, was that anything which caused the layer of insulation to rub against or contact the work 10 could result in removal of the insulation for the electrode. This had the undesirable consequence of thereby exposing additional area of the conductive tube whereby further side electrolytic action is affected which destroys the uniformity in the hole. Such contacting of the electrode with the workpiece occurs principally at or near the tip of the electrode. Thus, in the preferred embodiment of the present invention the sleeve 26 is placed at the tip of the electrode 16 whereby any contact of the electrode 16 with the work 10 will be between the sleeve 26 and the work 10. Such contact, however, will not cause shorting of the electrolytic circuit as the sleeve 26 is insulated from the electrode tube 22 by the insulation 24. In this manner the layer of insulation material 24 is protected.

Furthermore, since the sleeve 26 is made of tantalum, columbium, tungsten, or titanium, it is very strong and resistant to abrasive contact with the workpiece 10. In addition, if the sleeve 26 should become anodic by contact with the workpiece, or by current flow from the workpiece to the sleeve 26, the sleeve 26, being made of passivating material, will not be acted upon, eroded, or the like, the electrolytic process, and will be passivated by an inert insulating layer on the surface. In this manner the sleeve 26 remains intact to protect the insulation layer 24 for an indefinite period of time.

It will be understood that since the insulating material 24 and a sleeve 26 have a finite thickness, it is necessary to assure that there is sufficient side action in order that the hole being formed is large enough to accept the electrode 16 and provide a gap or opening through which electrolyte may escape from the work area. In practice, it has been found that a clearance in the order of .002" between the hole and the mean dimension of the exterior of the electrode 16 is a satisfactory clearance.

Referring now to FIG. 3, there is shown a modified electrode 40 embodying the features of the present invention. As in the electrode 16 described hereinbefore, the electrode 40 includes a hollow conductive tube 22. In this embodiment, however, the insulation layer 42 does not extend to the vary end of the conductive tube 22, but instead terminates in close proximity to the free end thereof, as far away as in the order of about .030" from the end of the conductive tube 22. A protective sleeve 44, which is in all respects similar to the sleeve 26 described hereinbefore, is placed about the exterior of the tube 22 at the outer end of the insulating layer 42 to protect this layer in the same manner described hereinbefore.

With respect to the amount of uninsulated or exposed portion at the working tip of the electrode 40, this will be controlled by three factors. First, the speed of advance or penetration affects the requirement as to the degree of exposure at the tip. The slower the rate of advance, the more time is provided for side action, and accordingly the narrower the exposed portion may be.

Second, the thickness of insulation 42 and the sleeve 44 has to be considered, as the greater their combined thickness, the more tip exposure is required to produce a sufficient amount of side action to provide clearance for the sleeve 44 and the layer of insulation 42.

Third, within limits the greater the absolute pressure in the electrolyte at the exposed portion of the tip, the narrower the exposed portion may be. Pressure at the tip can also be obtained by introducing the electrolyte in the space around the exterior of the tube and exiting it through the center as shown in the aforementioned copending applications of Joseph L. Bender and Lynn A. Williams, Serial No. 37,766, and Lynn A. Williams, Serial No. 212,916.

While other factors, such as the input temperature of the electrolyte, the degree of heating within the electrode tube, the nature of the electrolyte itself, etc., all enter into any absolute equation, it has not yet been possible to make a quantitative formulation which interrelates all of these factors. Enough is known, however, to show that the exposure at the tip may be at least equal to the thickness of the insulating layer, and that the total insulating layer itself should not be greater than .010" for best results.

Referring now to FIG. 4, there is shown another modified electrode 50 in the general arrangement discussed hereinbefore with respect to FIG. 1. For convenience, like parts will be designated by the same reference numerals used in FIG. 1, and need not be discussed in detail. In this instance, the electrode 50 has a layer of insulation material 52 which extends from the free end of the electrode 50 about 90 percent of the way back toward the manifold 17 and the drive head 18. A refractory metal sleeve 54 completely protects the entire length of the insulation material 52. The sleeve 54 is otherwise identical to the sleeves 26 and 44 described hereinbefore. In this embodiment, however, the sleeve 54 is made anodic by a line 36a interconnecting the positive potential line 36 and the sleeve 54. In this manner the sleeve 54 is maintained in an anodic state and therefore has at all times its protective film thereon to prevent erosion thereof during the electrolyte process, and since the sleeve 54 and the workpiece 10 are at the same potential, no shorting in the electric circuit can take place even though contact of the bare metals be inadvertently made.

It will be understood that the insulation material in the embodiments described may extend back from the tip of the electrode the entire length thereof or only so far as the electrode will extend into the workpiece, or any distance therebetween. Furthermore, it will be understood that the electrodes 16 and 26 may also be maintained in an anodic state during electrolytic hole sinking, as in the embodiment shown in FIG. 4, by connecting them to a positive potential.

While the embodiments described herein are at present considered to be preferred, it will be understood that various modifications and improvements may be made therein, and it is intended to cover in the appended claims all such modifications and improvements as fall within the true spirit and scope of the invention.

What is desired to be claimed and secured by Letters Patent of the United States is:

1. An electrode for electrolytic hole sinking in an electrically conductive and electrochemically erodable workpiece, comprising a tube of substantially uniform transverse section having a working tip at one end, means attached to the other end of said tube for supporting said tube and for connecting said tube into the circuit supplying electrolyte under pressure to a work gap between said working tip and the workpiece, a layer of insulating material covering the external sidewall surface of at least a portion of said tube intended to extend into the hole, and a sleeve mounted on said tube and insulation material, said sleeve made of material selected from the group consisting of titanium, tantalum, columbium, and tungsten.

2. The electrode of claim 1, wherein means are attached to said sleeve whereby said sleeve is maintained anodic with respect to said tube during said electrolytic hole sinking.

3. The electrode of claim 1, wherein said sleeve has a thickness in the range of about four thousandths to ten thousandths of an inch.

4. An electrode for electrolytic hole sinking in an electrically conductive and electromechanically erodable workpiece, comprising a tube of substantially uniform transverse section, said tube having first and second ends, means attached to said first end of said tube for supporting said tube and supplying electrolyte under pressure thereto, said second end constituting the working tip of said electrode, a layer of insulating material covering the external sidewall surface of at least a portion of said tube intended to extend into the hole, said layer extending to said second end of said tube, a sleeve mounted on said tube and insulation material and extending over at least a portion of said insulation layer, said sleeve extending to said second end of said tube and being made of material selected from the group consisting of titanium, tantalum, columbium, and tungsten.

5. The electrode of claim 4, wherein means are attached to said sleeve whereby said sleeve is maintained anodic with respect to said tube during said electrolytic hole sinking.

6. The electrode of claim 4, wherein said sleeve has a thickness in the range of about four thousandths to ten thousandths of an inch.

7. An electrode for electrolytic hole sinking in an electrically conductive and electrochemically erodable workpiece, comprising a tube of substantially uniform transverse section having a working tip at one end, means attached to the other end of said tube for supporting said tube and supplying electrolyte under pressure thereto, a layer of insulating material covering the external sidewall surface of at least a portion of said tube, said layer of insulating material terminating adjacent said working tip to form an exposed portion at said working tip, and a sleeve mounted on said tube and said insulating material adjacent the end of said insulating material adjacent said exposed portion, said sleeve being made of material selected from the group consisting of titanium, tantalum, columbium, and tungsten.

8. The electrode of claim 7, wherein said exposed portion extends backwardly from said one end by a distance in the order of about .030 of an inch.

9. The electrode of claim 7, wherein said sleeve has a thickness in the range of about four thousandths to ten thousandths of an inch.

10. The electrode of claim 7, wherein means are attached to said sleeve whereby said sleeve is maintained anodic with respect to said tube during said electrolytic hole sinking.

11. An electrode for electrolytic hole sinking in an electrically conductive and electrochemically erodable workpiece, comprising a length of conductive tubing of substantially uniform transverse section having a working tip at one end, means attached to the other end of said tube for supporting said tube and supplying electrolyte under pressure thereto, a layer of insulating material covering the external sidewall surface of at least the portion of said tube intended to extend into the hole, a sleeve mounted on said tube and said insulating material for the length of said insulating material, and means attached to said sleeve whereby said sleeve is maintained anodic with respect to said tube during electrolytic hole sinking, said tube being made of material selected from the group consisting of titanium, tantalum, columbium, and tungsten.

12. The electrode of claim 11, wherein said sleeve has a thickness in the range of about four thousandths to ten thousandths of an inch.

References Cited by the Examiner

UNITED STATES PATENTS

| 1,970,804 | 8/1934 | Kerk. | |
|---|---|---|---|
| 2,739,935 | 3/1956 | Kehl et al. | 204—143 |

FOREIGN PATENTS 335,003   9/1930   Great Britain.

JOHN H. MACK, *Primary Examiner.*

R. K. MIHALEK, *Assistant Examiner.*

Dedication 3,278,411.—*Lynn A. Williams*, Winnetka, Ill. ELECTROLYZING ELECTRODE. Patent dated Oct. 11, 1966. Dedication filed Dec. 23, 1971, by the assignee, *Anocut Engineering Company*.
Hereby dedicates to the Public the portion of the term of the patent subsequent to Dec. 24, 1971.
[*Official Gazette April 18, 1972.*]